US006744359B1

(12) United States Patent
Wasilewski et al.

(10) Patent No.: US 6,744,359 B1
(45) Date of Patent: Jun. 1, 2004

(54) EMERGENCY STOP WARNING SYSTEM

(76) Inventors: Andrzej Wasilewski, #301, 1815 16A St S.W., Clagary, Alberta (CA), T2T 4J8; Maurycy Kociszewski, D-11423 8St S.W., Calgary, Alberta (CA), T2W 2N4; Jaroslaw Kociszewski, #204, 2137 16 St. S.W., Calgary, Alberta (CA), T2T 4E5; Ronald Brookes, 115 Wildwood Dr. S.W., Calgary, Alberta (CA), T3C 3C7

( * ) Notice: Subject to any disclaimer, the term of this patent is extended or adjusted under 35 U.S.C. 154(b) by 827 days.

(21) Appl. No.: 08/247,709

(22) Filed: May 23, 1994

(51) Int. Cl.[7] .................................................. B60Q 1/26
(52) U.S. Cl. ...................... 340/467; 340/436; 340/463; 340/464; 340/479; 340/468; 340/469; 307/10.8; 200/61.45
(58) Field of Search ............................... 340/436, 463, 340/464, 479, 467, 468, 469; 307/10.8; 200/61.45

(56) References Cited

U.S. PATENT DOCUMENTS

| 3,286,055 A | 11/1966 | Jewell ........................ 280/735 |
| 3,762,495 A | 10/1973 | Usui et al. ................... 280/735 |
| 4,176,340 A | 11/1979 | Steinmeier ................... 340/436 |
| 4,357,594 A | * 11/1982 | Ehrlich et al. ............... 340/467 |
| 4,384,269 A | 5/1983 | Carlson ........................ 340/467 |
| 4,470,036 A | 9/1984 | Doerr et al. ................. 340/464 |
| 4,723,078 A | 2/1988 | Neuffer et al. .............. 340/436 |
| 4,843,368 A | * 6/1989 | Poulos ......................... 340/464 |
| 5,122,954 A | * 6/1992 | Okano .................... 364/424.05 |
| 5,231,373 A | * 7/1993 | Freeman et al. ............. 340/479 |
| 5,269,187 A | * 12/1993 | Hanson ......................... 73/495 |
| 5,298,882 A | * 3/1994 | Tsai .............................. 340/468 |

FOREIGN PATENT DOCUMENTS

JP          0047232          4/1977

* cited by examiner

Primary Examiner—Daryl Pope
(74) Attorney, Agent, or Firm—Fay, Sharpe, Fagan, Minnich & McKee, LLP

(57) ABSTRACT

An electronic deceleration/accident warning system for a motor vehicle comprising a high energy flashing strobe light facing following traffic, and a control unit including a controller means for receiving input signals from a g-level sensor and a brake signal, and in response controlling the flash rate of the strobe light. Other optional inputs such as theft alarm and ABS are provided along with optional outputs such as safety belt tensioners and airbags.

14 Claims, 4 Drawing Sheets

EMERGENCY STOP WARNING SYSTEM

FIELD OF THE INVENTION

This invention relates in general to vehicle emergency warning systems, and more particularly to an electronic deceleration/accident warning system for a motor vehicle having a high energy strobe light facing following traffic, and a microcontroller for controlling the strobe light flash pattern and other safety devices, in response to different emergency situations, such as rapid deceleration, collision, accident while parked, among others.

BACKGROUND OF THE INVENTION

Inertial activated devices are well known for turning on a warning signal at the rear of an automobile.

U.S. Pat. No. 3,286,055 (Jewell) discloses an impact switch for a motor vehicle for enabling a flashing warning light in the event of impact. The device comprises an impact switch, flasher and a dry cell battery which are all housed in a self-contained unit, which is separable from the vehicle. A breakable rod is inserted vertically into a movably weight so as to hold the switch in an open position. On impact, the weight moves, breaks the rod and closes the switch to enable the flashing warning light.

U.S. Pat. No. 3,762,495 (Usui et al) discloses a method and device for generating and transmitting a signal to a vehicle safety device (such as an air bag or net) in response to rapid deceleration of the vehicle. A signal voltage corresponding to the magnitude of deceleration is generated by a detector and compared via a comparator to predetermined deceleration values (i.e. pre-set voltages) which correspond to different levels of deceleration, and different rates of change in deceleration. When the deceleration is within predetermined ranges, a signal is generated to trigger the safety device. A variety of preset levels are provided corresponding to different types of impact (e.g. car against barrier, side-car collisions, etc.).

U.S. Pat. No. 4,176,340 (Steinmeier) discloses an apparatus for automatically activating a flasher system in response to a vehicle shock, such as occurs with hard braking or an accident. The system can be connected to vehicle flashers or turn signals. The system consists of an upright cylinder housing with an internal switch. An iron plate is also provided inside the housing along with a tiltable magnetic element that tilts on the application of a shock. The tilt of the magnetic element pulls a trip wire that closes the switch for activating the flashers. To reset the device, the flashers must be manually turned on, and then off.

U.S. Pat. No. 4,384,269 (Carlson) discloses a vehicle acceleration and deceleration warning system where the visual indicators of acceleration and deceleration also serve as turn signals. The warning system has priority over the turn signals. An electromechanical transducer converts deceleration into an electrical quantity which changes according to the rate of deceleration. The transducer consists of a pendulum that swings forward and backward (based on acceleration and deceleration) into the path of a light and invariably blocks the light from reaching a set of optical sensors. The optical sensors generate a variable voltage signal based upon the amount of light striking them. The variable signal activates a variable oscillator that causes the signal lights to flash at a rate which is proportional to the rate of deceleration. If the deceleration rate is above a predetermined threshold, the signal lights remain flashing until they are manually reset.

U.S. Pat. No. 4,470,036 (Doerr) discloses an automotive signal system consisting of three modes: stop, caution and go with three corresponding coloured lights. The ignition switch is used to turn on the signal. In one embodiment, the stop light is triggered by the brake pedal, the caution light is triggered by a release of the gas pedal, and the green light is triggered by depressing the gas pedal. In an alternative embodiment, the lights are triggered by the acceleration and deceleration of the vehicle detected via a mass suspended inside a chamber between two springs. When the vehicle decelerates, the mass moves forward, triggering the stop light. When the vehicle accelerates, the mass moves backwards, triggering the green light. When the mass is stationary, the caution light is lit.

U.S. Pat. No. 4,723,078 (Neuffer et al) discloses a circuit arrangement for the automatic engagement of a vehicle hazard warning system, which is triggered by accident and by emergency braking. The system consists of two circuits: one based upon high deceleration of the vehicle (such as in an accident) which automatically engages the hazard warning system; and a second, more sensitive circuit for lower deceleration that engages after a time delay and only in the event of sustained deceleration. The second circuit is also connected to the brake pedal so that hard deceleration does not trigger the flashers. Thus, this prior art system is designed to prevent false activation which may be caused by bumps or curves.

Japanese laid-open specification number 0047232 (Orihashi) discloses a device for activating a lamp in response to rapid deceleration. The device consists of a movable weight inside a cylinder. When the vehicle slows down, the weight moves and closes the switch for turning on the light.

Accordingly, prior art warning systems are known for initiating flashing of a light for notifying any following traffic of an emergency, wherein the frequency of the light is determined by the amount of detected g-forces of deceleration. Furthermore, it is known from the prior art to activate different safety devices in response to detecting multiple g-forces of deceleration (e.g. U.S. Pat. No. 3,762,495). However, such prior art systems have typically been realized using mechanical or electromechanical g-force sensors for controlling the warning light or safety device. Mechanical sensors are known to be unreliable and prone to breakage. Similarly, discrete electrical components are subject to failure and inaccuracy due to voltage drift, etc. Furthermore, such prior art devices typically provide one or more predefined operating modes, without the ability to provide multiple operating modes with definable primary and secondary functions.

In particular, the Applicants are unaware of any teaching in the prior art of a vehicle emergency warning system in which a high energy strobe light is used to warn following traffic of an emergency situation, and in which a microcontroller and g-level sensor are incorporated for effecting two primary functions: firstly, causing the strobe light to flash according to a first predetermined pattern in the event of hard deceleration of the vehicle, and secondly causing the strobe light to flash according to a second predetermined pattern which is perceptively different from said first predetermined pattern in the event of a collision, in combination with one or more secondary functions which may include causing the strobe light to flash according to the aforementioned second predetermined pattern in the event that the ignition is off and the car is bumped or rocked while parked, or causing the strobe light to flash according to the aforementioned second predetermined pattern in response to the microcontroller receiving an input signal from an existing theft alarm system installed on the vehicle, or controlling activation of various existing safety systems such as safety belt tensioners and airbags in response to high deceleration or collision. The frequency of flashing the strobe light is preferably more than twice the normal flashing frequencies of any other lamps operating on the vehicle (e.g. turn indicator, hazard warning, etc.), in order to distinguish a real emergency situation from normal vehicle signalling.

SUMMARY OF THE INVENTION

According to the present invention, a microcontroller-based vehicle emergency warning system is provided comprising a high energy, flashing strobe light which is disposed in the vehicle so as to face following traffic and a microcontroller-based system for providing two primary functions and a plurality of secondary functions. The first primary function is that of providing a warning signal to the following traffic in the form of a first predetermined pattern which, according to the preferred embodiment, comprises continuous high-frequency, high energy flashes in the event of sudden application of the brakes and high levels of deceleration. The second primary function is that of providing a warning signal to the following traffic in the form of a second predetermined pattern which, according to the preferred embodiment, comprises intermittent high frequency, high energy flashes in the event of vehicle impact. The first secondary function of the system is that of providing the second predetermined pattern of high energy flashes of the strobe light in the event the vehicle is hit while parked. The second secondary function is that of providing the second predetermined pattern of high energy flashes of the strobe light upon receiving an input signal from an existing theft alarm signal. The third secondary function is that of monitoring an input from an existing ABS system and overriding the requirement of detecting high rate of deceleration before executing the aforementioned first primary function in the event of activation of the ABS system, which is useful in driving conditions which are conducive to vehicle skidding such as on an icy or wet roadway. According to an additional aspect of the invention, further active safety devices such as safety belt tensioners and air bags may be controlled in response to one or both of high levels of deceleration and impact.

The system of the present invention includes a backup power supply which is activated only in the event of an accident in which the vehicle battery has been destroyed. Thus, according to this feature of the invention, the system remains in operation to perform the second primary function even in the case of serious collision.

By implementing the vehicle emergency warning system of the present invention utilizing a microcontroller, greater flexibility and reliability are provided over prior art systems of which the applicants are aware. Furthermore, the control unit of the present invention may be fabricated at low cost and with minimal space requirements in the vehicle.

BRIEF DESCRIPTION OF THE DRAWINGS

A preferred embodiment of the invention is described herein below with reference to the following drawings, in which.

DETAILED DESCRIPTION OF THE PREFERRED EMBODIMENT

Figure 1:
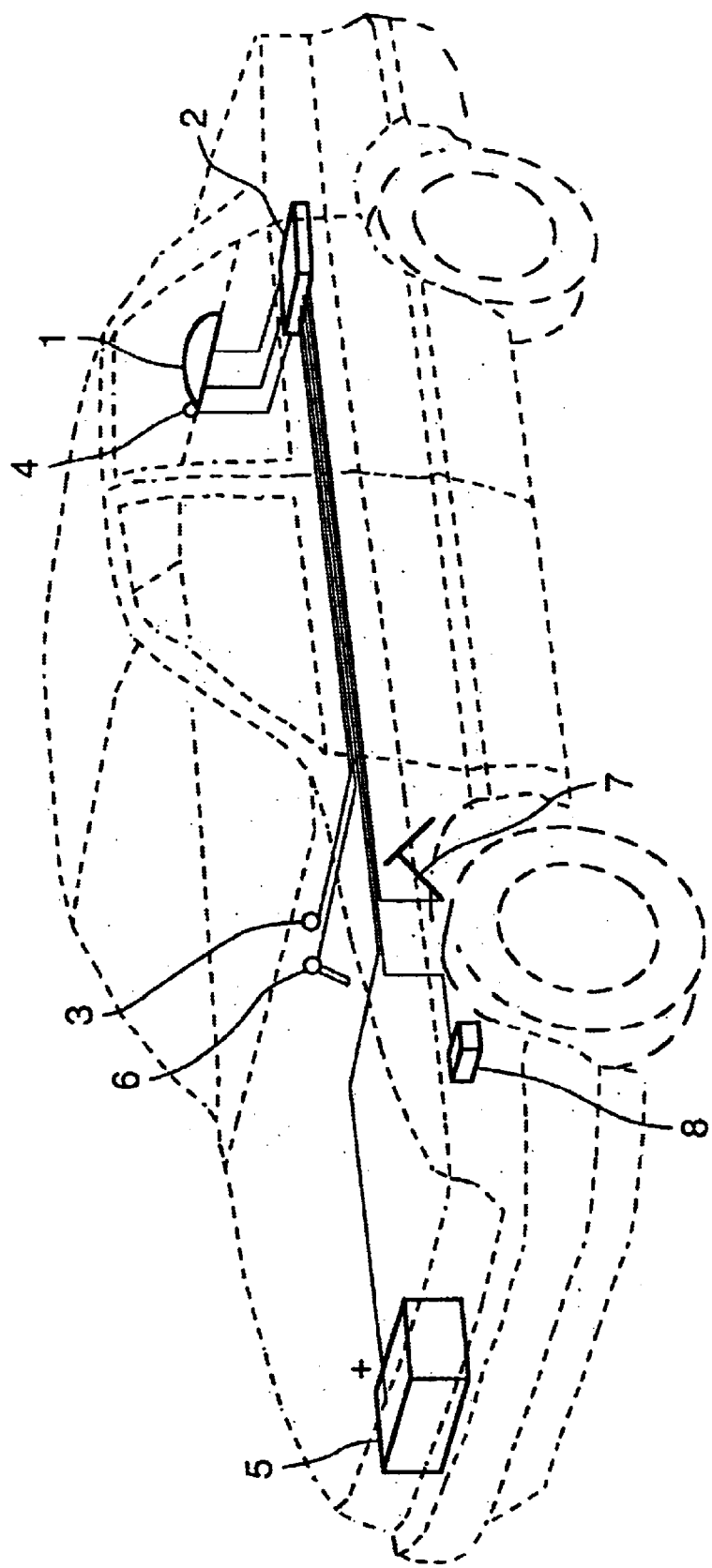
FIG. 1 is a schematic view of a vehicle incorporating the emergency warning system of the present invention.

FIG. 1 schematically shows the main elements of the vehicle emergency warning system according to the present invention, installed in an automobile. The system comprises a strobe light 1, a control unit 2, control indicator or lamp 3 (which is preferably disposed on the vehicle dashboard), and a reset switch 4 (which is preferably mounted adjacent the strobe light 1). The control unit 2 has a plurality of inputs connected to respective ones of the vehicle battery 5, ignition switch 6, brakes 7, optional devices 8 and the reset switch 4.

The strobe light 1 may be placed anywhere at the rear of the vehicle and positioned so as to face the following traffic. Thus, the strobe light 1 may be incorporated into standard tail lamps, but preferably is mounted adjacent or replaces the third stop lamp which is usually mounted on the rear spoiler, rear windshield or on the vehicle roof. Preferably, the strobe light is incorporated into a single unit along with the stop light, as shown in FIG. 1.

Figure 2A:
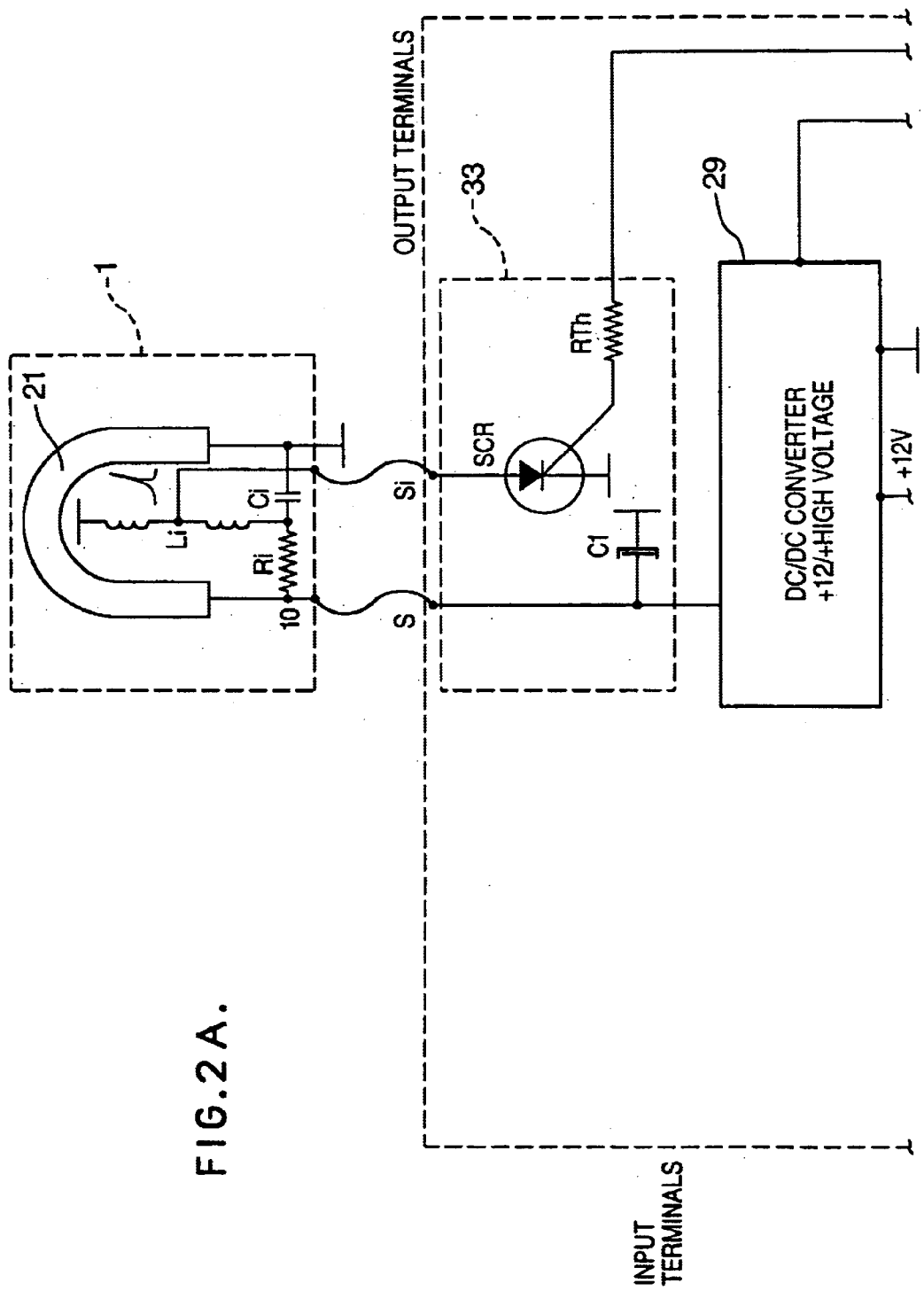
FIG. 2 is a schematic diagram showing details of the strobe light, control unit, control lamp, reset switch and various inputs and outputs of the control unit according to the preferred embodiment.
Figure 2B:
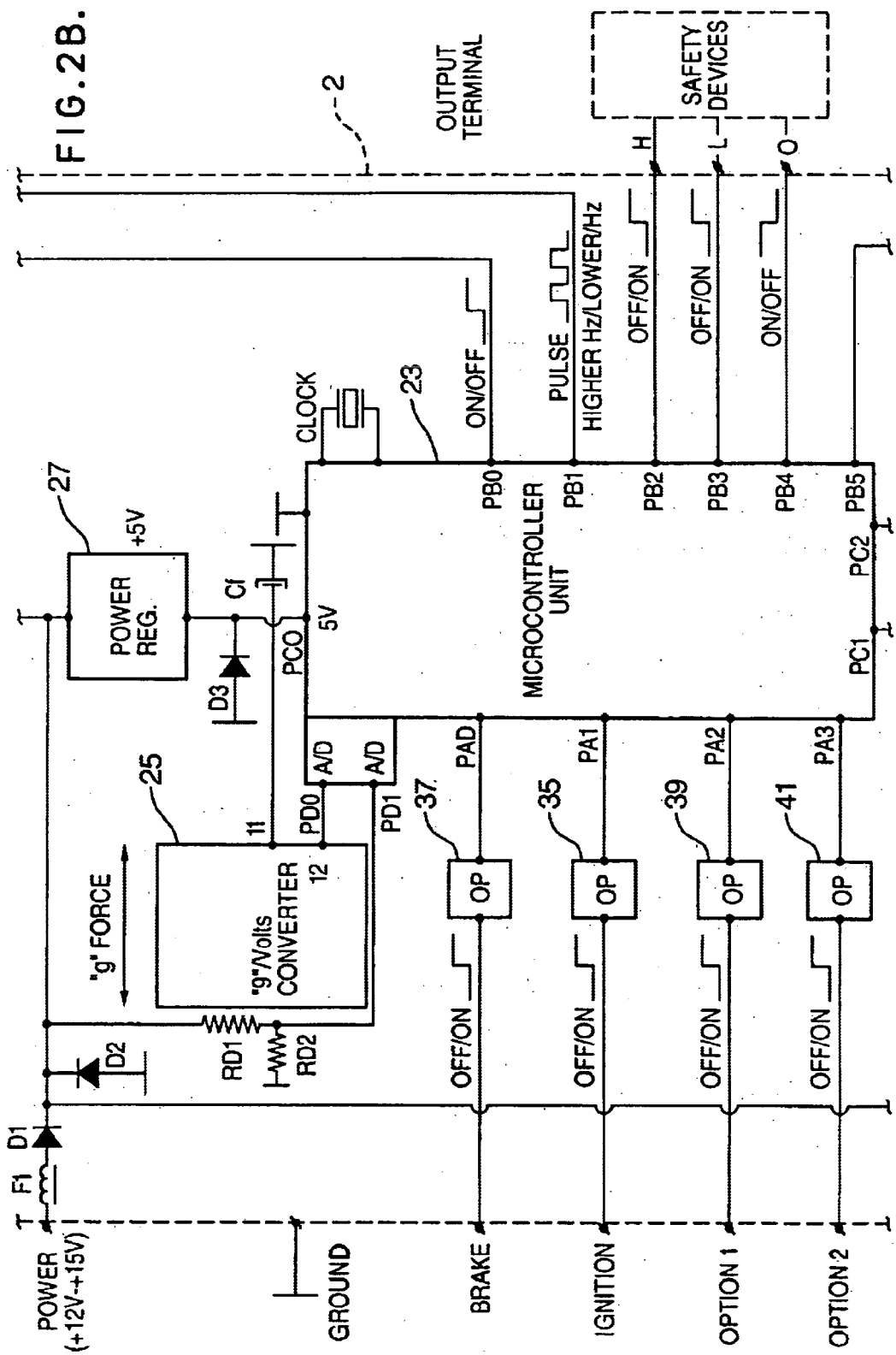
Figure 2C:
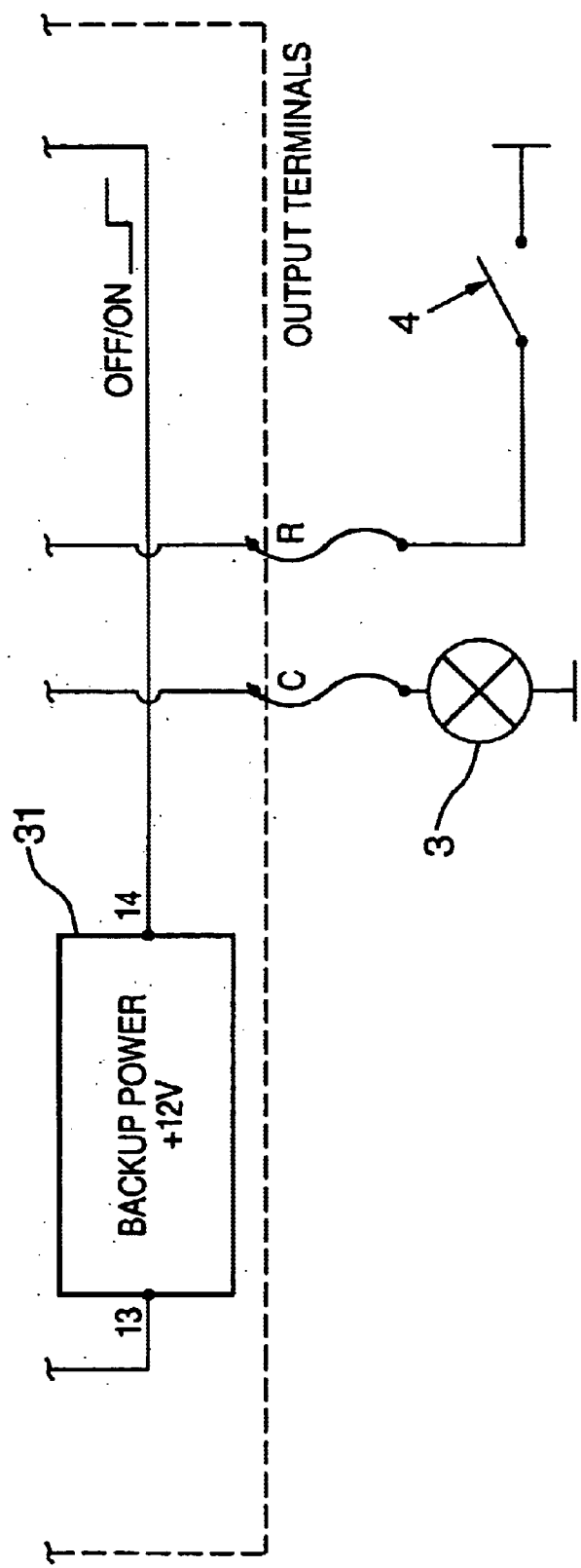

Turning to FIG. 2, the strobe light 1 is shown comprising a light element 21 which is preferably a high energy strobe light bulb which is capable of providing a sufficiently bright signal to command the immediate attention and reaction of following drivers, and is also highly visible in inclement weather and difficult driving conditions such as fog, snow storms, etc. The light 1 includes an ignition circuit comprising a resistor Ri, capacitor Ci and centre tapped inductor Li which controls flashing of the light element 21 without requiring excessively high voltage input signals to the light 1. As shown in FIG. 2, the strobe light 1 is connected to output terminals S and Si of the control unit 2.

The control unit 2 may be placed anywhere inside the vehicle, but is preferably located behind the rear seats as shown in FIG. 1. The control unit 2 of the preferred embodiment is a fully electronic, solid state unit with no moving parts such as are required in the prior art. The control unit comprises a microcontroller 23, a "g"/Volts converter 25, a power regulator 27, a DC/DC converter 29, a backup power source 31 which is preferably in the form of long lasting dry battery cells (e.g. lithium type cells), and a trigger circuit 33 for turning on the strobe light 1 according to an incoming pulse pattern from microcontroller 23.

The microcontroller 23 is preferably an 8 bit integrated circuit microcomputer and integrated analogue/digital converter and clock. The microcontroller 23 is programmed in a well known manner for controlling the entire system, analyzing incoming signals and maintaining proper responses in accordance with this programming, as discussed in greater detail below.

The "g"/Volts converter 25 is also an integrated circuit chip for providing low inertia, fast response acceleration/deceleration detection. The circuit 25 generates an accurate voltage signal output which is directly proportional to an applied amount of acceleration/deceleration (ie. g-levels in meters/sec$^2$). According to the preferred embodiment, the converter is a model XL-50 manufactured by Analog Devices which generates an output of ±200 mV per g-level, although other suitable "g"/Volts converters may be used.

An output of the "g"/Volts converter 25 (pin 12) is connected to a first analog input (PD0) of microcontroller 23. As indicated above, the microcontroller 23 incorporates an internal A/D converter for translating analog voltage signals output from circuit 25 into digital values for further processing within the microcontroller 23.

The power regulator 27 is also preferably an integrated circuit chip for converting DC +12V into a stabilized DC +5V signal for powering microcontroller 23 and converter 25. An input of the power regulator 27 is connected to the vehicle battery via a coil F1 and diode D1 in a well known manner. Likewise, an output of power regulator 27 is connected to an input of the "g"/Volts converter 25 (pin 11) and a power input (PC0) of microcontroller unit 23, via noise filter capacitor Cf and Zener breakdown diode D3, also in a well known manner.

The trigger circuit 33 has an enable input connected to the output of DC/DC converter 29, and a modulation input connected to a digital output PB1 of the microcontroller unit 23. A pair of outputs of the trigger circuit 33 are connected to output terminals S and Si of the control unit 2, to which the strobe light 1 is connected, as discussed above. As shown in FIG. 2, the trigger circuit 33 preferably comprises a charge storage capacitor C1, an SCR and modulating input resistor RTh.

Power generated by the vehicle battery (+12V/+15V) is applied to the "POWER" input of control unit 2. The DC power voltage flows through coil filter F1, and diode D1 to a node connecting DC/DC converter 29 and power regulator 27. A voltage suppressor D2 is also connected to this node. The input power DC signal also passes through voltage divider RD1, RD2, and is applied to a second analog input (PD1) of microcontroller 23. This port of microcontroller 23 monitors for continuity of the main power supply. In the event of a main power failure due to a serious accident, back-up power 31 is enabled via the PB5 output of microcontroller 23 for powering the control unit 2.

A +12V ignition signal is applied to the "IGNITION" input of control unit 2 in response to a driver turning on the ignition key. This DC voltage is converted via opto-coupler 35 from a +12V DC signal to a TTL level signal for application to digital input PA1 of microcontroller 23. Thus, optocoupler 35 effectively isolates the microcontroller 23 from high voltage surges on the ignition line.

Microcontroller 23 is preferably interrupt driven, so that in response to receiving a signal on input PA1, the microcontroller 23 initiates a self-testing and auto-setup program. According to the auto-setup feature, the set point of "g"/Volts converter 25 is initially established. More particularly, since the voltage output of converter 25 (input PD0 to microcontroller 23) can drift slightly due to changes in temperature, ageing of components, etc., upon first turning on the ignition, microcontroller 23 samples the voltage output at PD0 and calibrates the 0 g-level to the initial voltage appearing on output PD0. Normally, the 0 g-level corresponds to approximately 1.8 Volts.

After completing the set-up procedure, and provided that there is no failure in the system as a result of the self-testing program, microcontroller 23 generates a signal on output PC1 for causing the control lamp 3 to be illuminated, via output terminal "C".

The control lamp 3 may be in the form of a small light for simply indicating positive results of the self test or diagnostic function of microcontroller 23 upon initial power-up. Microcontroller 23 also generates a logic high signal on the PB4 output for application to the "O" output terminal of control unit 2, which can be connected to a safety device with "normally closed" status.

Microcontroller 23 then begins polling input P0D to determine whether the voltage output of "g"/Volts converter 25 exceeds a first or a second predetermined threshold, as discussed in greater detail below.

A brake signal appears on the "BRAKE" input of control unit 2 in response to the driver applying the brakes, and is converted to TTL level for application to the PA0 input of microcontroller 23 via optocoupler 37. Thus, each application of the brakes is detected by microcontroller 23. In the event of a sudden application of the brakes resulting in more than a first predetermined force level, microcontroller 23 detects a voltage on the PD0 input above a first predetermined voltage level and in response generates a logic high signal on the PB0 output, and simultaneously generates a first predetermined pulse pattern which, according to the preferred embodiment, is a high frequency pulse signal on the PB1 output (e.g. a 5 Hz pulse), for application to the ignition SCR of trigger circuit 33, and also generates a logic high output signal via the PB2 output to output terminal "H". The signals on outputs PB0 and PB1 of microcontroller 23 cause the strobe light 1 to flash at a high frequency (e.g. 5 Hz). The logic high signal on terminal "H" can be used to activate a safety device such as a safety belt tensioner.

According to the preferred embodiment, with the output of converter 25 calibrated for 0 g-level at the typical normal value of approximately 1.8 Volts, the first predetermined force level is 0.7 g corresponding to a first predetermined voltage level of approximately 1.95 Volts. However, it is contemplated that the first predetermined force level may be anywhere in the range of from 0.65 g to 0.75 g to cover a suitable range of emergency braking levels of deceleration. Furthermore, according to the preferred embodiment, the first predetermined pattern is a continuous pulse pattern at 5 Hz.

The signals on outputs PB0, PB1 and PB2 are disabled a predetermined length of time after the signal from converter 25 falls below the first predetermined voltage level. According to the preferred embodiment, this predetermined length of time is set at 5 seconds.

In the event of a sudden impact accident, the deceleration g-levels sensed by converter 25 are converted to DC voltages which exceed a second predetermined level. In response, microcontroller 23 generates a logic high signal on the PB0 output and a second predetermined pattern of pulse signal on the PB1 output for causing the strobe light 1 to flash. According to the preferred embodiment, the second predetermined pattern comprises a series of two light flashes at 5 Hz, each of the two light flashes being spaced apart by a 0.6 second pause. The microcontroller 23 also generates a logic high signal on output PB3 and a logic low signal on PB4 for application to terminals "L" and "O". However, contrary to the situation discussed above when the brakes are applied, resulting in a high deceleration rate, in the case of an impact accident, the signals on outputs PB0, PB1, PB3 and PB4 remain the same until the vehicle battery 5 (or backup power 31) is depleted, or until the control unit 2 is reset via switch 4. Terminals "L" and "O" may be connected to safety devices such as airbags (with safety devices connected to the "L" terminal being in a "normally open" status while devices connected to the "O" terminal are operated with "normally closed" status).

According to the preferred embodiment, with the output of converter 25 calibrated for 0 g-level at the typical normal value of approximately 1.8 Volts, the second predetermined force level is 4.0 g corresponding to a second predetermined voltage level of approximately 2.6 Volts in the event of a head-on collision, or approximately 1 Volt in the event of a rear collision.

In the event of an accident which destroys the vehicle battery 5, a lack of DC power signal is detected on input PD1 of microcontroller 23, which causes microcontroller 23 to generate a logic high signal on the PB5 output for enabling backup power 31 for powering the entire control unit 2 and light 1.

As discussed above, in addition to the two primary functions of the vehicle warning system of the present invention, a number of secondary functions are also performed.

When the ignition key is turned off, a logic low level is detected at the input PA1 of microcontroller 23. This causes microcontroller 23 to begin monitoring input PD0 for analog voltage signals exceeding a third predetermined value which is intermediate the first and second predetermined values discussed above. According to the preferred embodiment, with the output of converter 25 calibrated for 0 g-level at the typical normal value of approximately 1.8 Volts, the third predetermined force level is 1.0 g corresponding to a third predetermined voltage level of approximately 2.0 Volts in the event of a front-end stationary collision, or approximately 1.6 Volts in the event of a rear-en stationary collision.

In the event that the vehicle is hit from any direction while parked, such that the third g-level of 1.0 g is exceeded, microcontroller 23 responds by generating a logic high signal on the PB0 output and generating the aforementioned second pattern of pulse signal on the PB1 output which causes the strobe light 1 to flash according to the aforementioned second predetermined pattern. Microcontroller 23 disables the strobe light 1 after a predetermined time delay of 30 minutes.

According to a further secondary function, an alarm system may be connected to the control unit 2 via the "OPTION 1" input so that a positive signal generated by the alarm system is converted to TTL levels via optocoupler 39 and is applied to the PA2 input of microcontroller 23. Upon detecting a logic high level on input PA2 (with the ignition off), microcontroller 23 generates a logic high signal on the PB0 output and generates the aforementioned second predetermined pattern of pulse signal on the PB1 output for causing the strobe light to flash at the aforementioned second predetermined pattern for as long as the alarm is active.

According to yet another secondary function of the system according to the present invention, an automatic braking system (ABS) can be connected to the control unit 2 via the "OPTION 2" terminal. A logic high signal thereon is converted via optocoupler 41 to a TTL level and is applied to input PA3 of microcontroller 23. When the system is functioning in the first primary mode (with ignition on), detection of the signal on input PA3 overrides the requirement for a voltage being applied to the PD0 input of the microcontroller 23 in excess of the first predetermined level, before generating a logic high output signal on output PB0, a high frequency pulse signal on output PB1 and a logic high output signal on output PB2 (i.e. output terminal "H"). This results in high frequency flashing of the light 1 each time the ABS system is activated. This feature is useful for warning following traffic in the event that the vehicle is skidding on icy or wet roadway and when hard braking action does not produce a sufficient deceleration level to exceed the aforementioned first g-level.

In accordance with the foregoing, a vehicle emergency warning system is provided for effecting multiple primary and secondary functions including high frequency strobe light flashing according to one of two predetermined patterns for notifying following traffic in the event of hard braking or impact accidents, as well as interfacing with additional safety devices such as ABS, seat belt tensioners and air bags, and enhanced signalling of theft alarm activation systems.

Alternative embodiments and modifications of the system are possible. For example, it is contemplated that the strobe light may be replaced by any suitable high energy, visually perceptible light, such as a laser. All such modifications or alternatives are possible without departing from the sphere and scope of the invention as defined by the claims appended hereto.

We claim:

1. For use on a vehicle having a battery, an ignition and brakes, a vehicle emergency warning system, comprising:
    a) a high energy visually perceptible light mounted rearwardly of said vehicle so as to face traffic following said vehicle;
    b) a sensor mounted to said vehicle for generating an output signal proportional to g-levels experienced by said vehicle during acceleration and deceleration;
    c) a controller having a plurality of inputs and outputs, a first one of said inputs being connected to said sensor for receiving said output signal, a second one of said inputs being connected to said brakes, and a third one of said inputs being connected to said ignition, for:
        i) generating an enable signal on a first one of said outputs and generating a first pulse according to a first predetermined pattern on a second one of said outputs, only in the event said ignition is on, said output signal exceeds a first predetermined threshold level and said brakes are applied, and
        ii) generating said enable signal on said first one of said outputs and a further pulse signal according to a second predetermined pattern which is perceptively different than said first predetermined pattern on said second one of said outputs only in the event said ignition is on and said output signal exceeds a second predetermined threshold level which is greater than said first predetermined threshold level;
    d) a converter connected to said battery and said first output of said controller, for converting a 12 volt DC voltage from said battery to a suitable DC voltage in response to receiving said enable signal;
    e) a trigger connected to said converter, said light and said second output of said controller, for causing said light to flash at one of either said first predetermined pattern or said second predetermined pattern in response to receiving said high DC voltage from said converter and one of either said first pulse signal or said further pulse signal, respectively, from said controller; and
    wherein said controller generates said enable signal on said first one of said outputs and said further pulse signal according to said second predetermined pattern on said second one of said outputs in the event said ignition is off and said output signal exceeds a third predetermined threshold level intermediate said first and second threshold levels.

2. The vehicle emergency warning system of claim 1, wherein said controller generates an auxiliary output signal on a further output thereof for activating a safety device in the event said ignition is on, said output signal exceeds said first predetermined threshold level and said brakes are applied.

3. The vehicle emergency warning system of claim 1, wherein said controller generates an auxiliary output signal on a further output thereof for activating a safety device in the event said ignition is on, and said output signal exceeds said second predetermined threshold level.

4. The vehicle emergency warning system of claim 1, further including a backup power source for providing auxiliary power to said light, said controller, said converter and said trigger in the absence of sufficing operating power from said battery.

5. For use on a vehicle having a battery, an ignition and brakes, a vehicle emergency warning system, comprising:
   a) a high energy visually perceptible light mounted rearwardly of said vehicle so as to face traffic following said vehicle;
   b) a sensor mounted to said vehicle for generating an output signal proportional to g-levels experienced by said vehicle during acceleration and deceleration;
   c) a controller having a plurality of inputs and outputs, a first one of said inputs being connected to said sensor for receiving said output signal, a second one of said inputs being connected to said brakes, and a third one of said inputs being connected to said ignition, for:
      i) generating an enable signal on a first one of said outputs and generating a first pulse according to a first predetermined pattern on a second one of said outputs, only in the event said ignition is on, said output signal exceeds a first predetermined threshold level and said brakes are applied, and
      ii) generating said enable signal on said first one of said outputs and a further pulse signal according to a second predetermined pattern which is perceptively different than said first predetermined pattern on said second one of said outputs only in the event said ignition is on and said output signal exceeds a second predetermined threshold level which is greater than said first predetermined threshold level;
   d) a converter connected to said battery and said first output of said controller, for converting a 12 volt DC voltage from said battery to a suitable DC voltage in response to receiving said enable signal;
   e) a trigger connected to said converter, said light, and said second output of said controller, for causing said light to flash at one of either said first predetermined pattern or said second predetermined pattern in response to receiving said high DC voltage from said converter and one of either said first pulse signal or said further pulse signal, respectively, from said controller, and wherein a further one of said inputs of said controller is connected to an automatic braking system for receiving a signal indicative of activation of said automatic braking system and in response generating said enable signal on said first one of said outputs and said first pulse signal according to said first predetermined pattern on said second one of said outputs.

6. For use on a vehicle having an ignition, brakes and a theft alarm system, a vehicle emergency warning system, comprising:
   a) light means mounted rearwardly of said vehicle so as to face traffic following said vehicle;
   b) a sensor mounted to said vehicle for generating an output signal proportional to g-levels experienced by said vehicle during acceleration and deceleration; and
   c) controller means connected to said sensor, said brakes, said ignition, and said theft alarm system, for causing said light means to flash in the event one of:
      i) said ignition is on and said output signal exceeds a first predetermined threshold level and said brakes are applied,
      ii) said ignition is on and said output signal exceeds a second predetermined threshold level which is greater than said first predetermined threshold level, and
      iii) said theft alarm system is activated.

7. The emergency stop warning system of claim 6, wherein said controller means causes said light means to cease flashing after a predetermined time period.

8. The emergency stop warning system of claim 6, wherein said controller means causes said light means to cease flashing in response to deactivation of said theft alarm system.

9. The emergency stop warning system of claim 6, further including a reset switch connected to said controller means for disabling said light means.

10. The emergency stop warning system of claim 6, wherein said light means flashes according to a first predetermined pattern in the event said ignition is on and said output signal exceeds said first predetermined threshold level and said brakes are applied.

11. The emergency stop warning system of claim 6, wherein said light means flashes according to a second predetermined pattern in the event said ignition is on and said output signal exceeds said second predetermined threshold level.

12. The emergency stop warning system of claim 6, wherein said first predetermined threshold is in the range of from 0.65 g to 0.75 g.

13. The emergency stop warning system of claim 6, wherein said second predetermined threshold is approximately 4.0 g.

14. The emergency stop warning system of claim 6, wherein said controller means calibrates said output signal from said sensor upon initial activation of said ignition in order to compensate for slight variations in said output signal due to temperature drift and component ageing.

* * * * *